Jan. 23, 1962     D. R. CORRELL     3,018,121
SPIRAL WIRE PIN RETAINER
Filed March 29, 1961
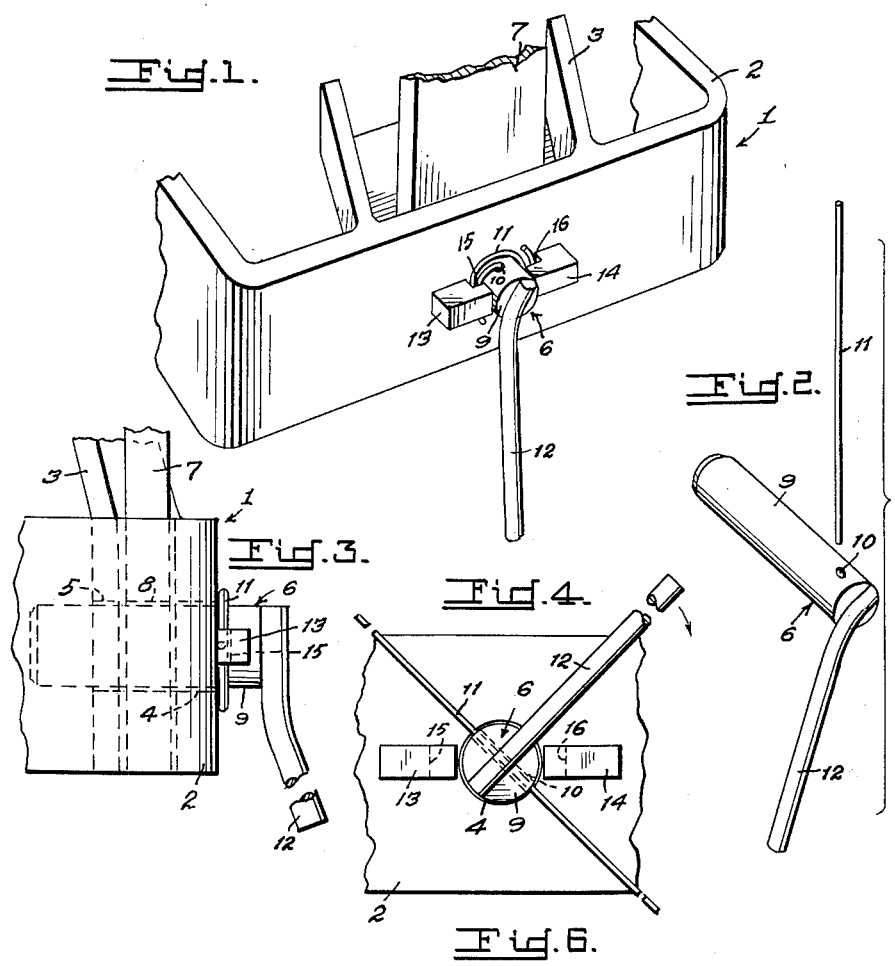
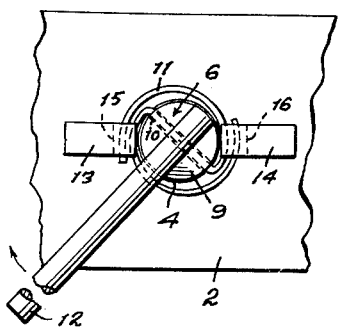
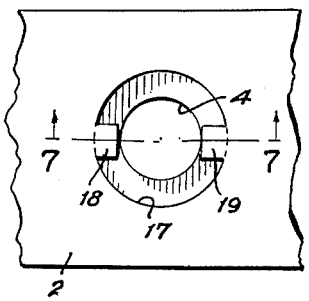
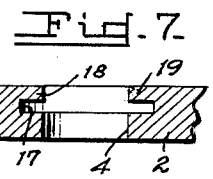
INVENTOR.
David R. Correll
BY
*S. J. Rotondi & A. J. Dupont*

United States Patent Office 3,018,121
Patented Jan. 23, 1962

3,018,121
SPIRAL WIRE PIN RETAINER
David R. Correll, 602 Colaine Drive, Aberdeen, Md.
Filed Mar. 29, 1961, Ser. No. 99,324
2 Claims. (Cl. 287—20)
(Granted under Title 35, U.S. Code (1952), sec. 266)

The invention described herein may be manufactured and used by or for the Government for governmental purposes without the payment to me of any royalty thereon.

This invention relates to a spiral wire pin retainer and more particularly to a means for retaining clevis pins or retaining pins in the coupling mechanisms of vehicles, trailers and the like.

The invention has for one of its objects to provide a spiral wire pin retainer that is simple and inexpensive of construction.

Another object is a pin retainer that is easily inserted into the clevis and removed without the use of tools and wtih nominal manual force and dexterity.

A further object is to provide a retainer pin for a coupling that will be secured positively to resist normal longitudinal motion induced by acceleration forces associated with automotive use.

A still further object is to provide a clevis pin that will not become loose and lost due to vibration.

A final object of the invention is the provision of a coupling pin that is free from detents, slots or other locking means that weaken the pin and that may cause interference or damage when being removed or installed.

With these and other objects in view, the invention resides in the novel features of construction and combinations and arrangements of parts as more fully hereinafter set forth.

In the drawings:

FIG. 1 is a perspective of a hitch assembly employing the spiral wire pin retainer of the invention;

FIG. 2 is an exploded perspective view showing the pin and a straight length of wire before insertion into the pin;

FIG. 3 is a side view of a portion of the clevis shown in FIG. 1, the retainer pin being assembled therein;

FIG. 4 is an end view of a portion of the clevis and the pin inserted with the wire placed therethrough before the pin is turned into its locked position;

FIG. 5 is a view similar to FIG. 4 wherein the pin has been rotated into locked position;

FIG. 6 is an end view of a portion of the clevis showing a modified form of the locking lugs; and FIG. 7 is a cross section taken along lines 7—7 of FIG. 6.

Referring to the drawing, the reference character 1 indicates generally a hitch for coupling vehicles or the like together and includes a U-shaped clevis 2 formed of flat steel, and a guideway 3 welded to the clevis.

Clevis 2 and guideway 3 are provided with aligned bores 4 in the clevis 2 and 5 in guideway 3 respectively for receiving the retainer pin of the invention which is indicated generally by 6. A tongue 7, attached to a vehicle to be hitched to the clevis 2 of the towing vehicle is bored as at 8 for the insertion of pin 6 when the vehicles are coupled.

Pin 6 comprises a shank portion 9 which is diametrically bored as at 10 for receiving a length of straight wire 11 and further is provided with a handle 12.

The means for retaining pin 6 in locked position in clevis 2 comprises a pair of diametrical opposed locking lugs 13 and 14 which have undercut portions 15 and 16.

Lugs 13 and 14 are fixed to the rearward face of clevis 2 by welding or the like and are disposed with the ends of the undercut portions 15 and 16 being adjacent to bore 4 in clevis 2 as best seen in FIGS. 4 and 5.

An alternate method of providing locking lugs whereby they are flush with the outer surface of clevis 2 is seen in FIGS. 6 and 7. Bore 4 of the clevis is counterbored as at 17 and locking lugs 18 and 19 project inwardly from the inner peripheral surface of counterbore 17.

The operation of the device is simple. The tongue of the vehicle to be towed is inserted into the guide 3 with its bore 8 aligned with bores 4 and 5. The pin 6 with the length of straight wire 11 inserted into bore 10 therein is then inserted through bores 4, 5 and 8 with the handle 12 approximately in the position shown in FIG. 4 and with wire 11 resting on the outer face of clevis 2. Now the pin 6 is ready to be locked. The pin 6 is rotated by means of handle 12 for approximately one half a turn as shown in FIG. 5. The straight length of wire 11 engages under the undercut portions 15 and 16 and coils around the shank portion 9 of pin 6 as it is turned, due to the lugs 18 and 19. Thus the pin 6 is now firmly locked against accidental displacement due to vibration, turning or shock.

To remove pin 6 and uncouple the tongue 7 from clevis 2, all that is necessary is to turn the handle 12 again in the same direction as before to approximately one half turn while at the same time applying a lift to the handle 12. The pin then comes out readily with a minimum of effort.

When reusing the pin, another length of straight wire is cut and the process repeated. Wire 11 is preferably of high tensile strength and being substantially of a length five times the diameter of pin 6.

Variations and modifications may be effected without departing from the scope of the novel concept of the present invention.

What is claimed is:

1. The combination comprising, a coupling including a U-shaped clevis having a bore therein and a channel shaped guideway secured to the inner side of said clevis, said guideway having a bore therein, said last named bore being in axial alignment with said bore in said clevis, a pin for insertion through said bores in said clevis and said guideway for retaining an apertured tongue therebetween, said pin having a diametrical bore therethrough and disposed near the outer end of said pin, a handle fixed to the outer end of said pin, means for retaining said pin in a locked position in said coupling comprising, a pair of diametrically opposed lugs fixed to the outer end of said clevis, each lug having an undercut portion at the inner end thereof and terminating adjacent the edge of said bore in said clevis, and a length of straight wire in said bore in said pin, the protruding ends of said wire being adapted to engage against said lugs when said pin is rotated in said coupling, said wire coiling about said pin when said pin is rotated, the terminal ends of said wire being nested under said undercut portions when said pin has been rotated approximately 180°.

2. A device as claimed in claim 1 wherein said wire is of a length equal to five times the diameter of said pin.

References Cited in the file of this patent

UNITED STATES PATENTS

| | | |
|---|---|---|
| 2,339,155 | Cusack | Jan. 11, 1944 |
| 2,522,215 | Du Shane | Sept. 12, 1950 |
| 2,705,157 | Dail | Mar. 29, 1955 |